United States Patent
DerMarderosian

(10) Patent No.: US 7,401,695 B2
(45) Date of Patent: Jul. 22, 2008

(54) COMPONENT CONTROL DEVICE, SYSTEMS, AND METHODS

(75) Inventor: Dikrun DerMarderosian, Quincy, MA (US)

(73) Assignee: The Gillette Company, Boston, MA (US)

( * ) Notice: Subject to any disclaimer, the term of this patent is extended or adjusted under 35 U.S.C. 154(b) by 178 days.

(21) Appl. No.: 11/448,998

(22) Filed: Jun. 7, 2006

(65) Prior Publication Data
US 2007/0284222 A1    Dec. 13, 2007

(51) Int. Cl.
B65G 47/44    (2006.01)
(52) U.S. Cl. .......................... 198/534; 198/529; 406/84
(58) Field of Classification Search ................. 198/526, 198/529, 534, 419.2, 461.1, 343.1; 193/32, 193/35 A; 406/83, 84
See application file for complete search history.

(56) References Cited

U.S. PATENT DOCUMENTS

| | | | |
|---|---|---|---|
| 2,761,633 A * | 9/1956 | Sindzinski | .................... 406/83 |
| 3,063,213 A | 11/1962 | Goran | |
| 3,169,308 A | 2/1965 | Goran | |
| 3,169,662 A | 2/1965 | Goran | |
| 3,263,305 A | 8/1966 | Butler et al. | |
| 3,275,191 A | 9/1966 | MacDonald | |
| 3,339,799 A | 9/1967 | Spisak | |
| 3,540,622 A | 11/1970 | Spisak et al. | |
| 3,583,599 A | 6/1971 | Spisak et al. | |
| 3,751,297 A | 8/1973 | Minbiole, Jr. et al. | |
| 3,883,040 A | 5/1975 | Bell | |
| 3,892,333 A | 7/1975 | Best et al. | |
| 3,895,431 A | 7/1975 | Froehlking | |
| 3,906,614 A | 9/1975 | Rayburn | |
| 4,002,265 A | 1/1977 | Dixon | |
| 4,114,663 A | 9/1978 | Viner | |
| 4,178,662 A | 12/1979 | Borodin | |
| 4,208,153 A | 6/1980 | Trethewy | |
| 4,278,184 A | 7/1981 | Willis | |
| 4,340,323 A | 7/1982 | Bankes et al. | |
| 4,573,830 A | 3/1986 | Richardson et al. | |
| 4,618,293 A * | 10/1986 | Heitmann | ..................... 406/83 |
| 4,629,059 A * | 12/1986 | Allinquant | ................. 193/35 A |
| 4,807,734 A | 2/1989 | Breeland, Jr. et al. | |

(Continued)

FOREIGN PATENT DOCUMENTS

DE    3148990 A1    6/1983

(Continued)

OTHER PUBLICATIONS

PCT International Search Report dated Dec. 4, 2007.

*Primary Examiner*—James R Bidwell
(74) *Attorney, Agent, or Firm*—Joanne N. Pappas

(57) ABSTRACT

The invention relates to apparatus, systems, and related methods for slowing the speed of components in transport systems. The apparatus includes a component track extending between input and output ends and sized for receiving the components, a speed control device mounted adjacent the component track and comprising a projection configured to move within the component track, a sensor positioned upstream of the input end of the component track to detect the speed of the components approaching the component track, and a controller in communication with the sensor and configured to adjust the speed of the projection within the component track based on the speed of the components approaching the component track, to decelerate the components within the component track.

26 Claims, 13 Drawing Sheets

U.S. PATENT DOCUMENTS

| | | | |
|---|---|---|---|
| 4,984,939 A | 1/1991 | Foreman et al. | |
| 5,011,339 A | 4/1991 | Aurtoi et al. | |
| 5,014,876 A | 5/1991 | Young et al. | |
| 5,143,216 A | 9/1992 | Aurtoi et al. | |
| 5,143,253 A | 9/1992 | Takahashi et al. | |
| 5,191,693 A | 3/1993 | Umetsu | |
| 5,217,329 A * | 6/1993 | Lang | 406/84 |
| 5,231,754 A | 8/1993 | Givler | |
| 5,289,625 A | 3/1994 | Umetsu et al. | |
| 5,299,351 A | 4/1994 | Takahashi et al. | |
| 5,319,846 A | 6/1994 | Takahashi et al. | |
| 5,368,193 A | 11/1994 | Takahashi et al. | |
| 5,385,434 A | 1/1995 | Quinn et al. | |
| 5,722,466 A | 3/1998 | Levin et al. | |
| 5,725,124 A | 3/1998 | Bustos et al. | |
| 6,024,208 A | 2/2000 | Chooi et al. | |
| 6,039,510 A * | 3/2000 | Greene et al. | 406/84 |
| 6,068,428 A | 5/2000 | Nair et al. | |
| 6,070,758 A | 6/2000 | Graham | |
| 6,116,407 A * | 9/2000 | Zolicoffer et al. | 198/530 |
| 6,120,216 A | 9/2000 | Teoh et al. | |
| 6,210,080 B1 | 4/2001 | Haul et al. | |
| 6,264,063 B1 | 7/2001 | Turner et al. | |
| 6,669,435 B2 | 12/2003 | Bertsch et al. | |
| 2002/0141832 A1 | 10/2002 | Bertsch et al. | |

FOREIGN PATENT DOCUMENTS

| | | |
|---|---|---|
| EP | 0 373 685 A1 | 6/1990 |
| EP | 0 511 093 A1 | 10/1992 |
| GB | 2067149 A | 7/1981 |
| JP | 52124667 | 10/1977 |
| JP | 58167319 | 10/1983 |

* cited by examiner

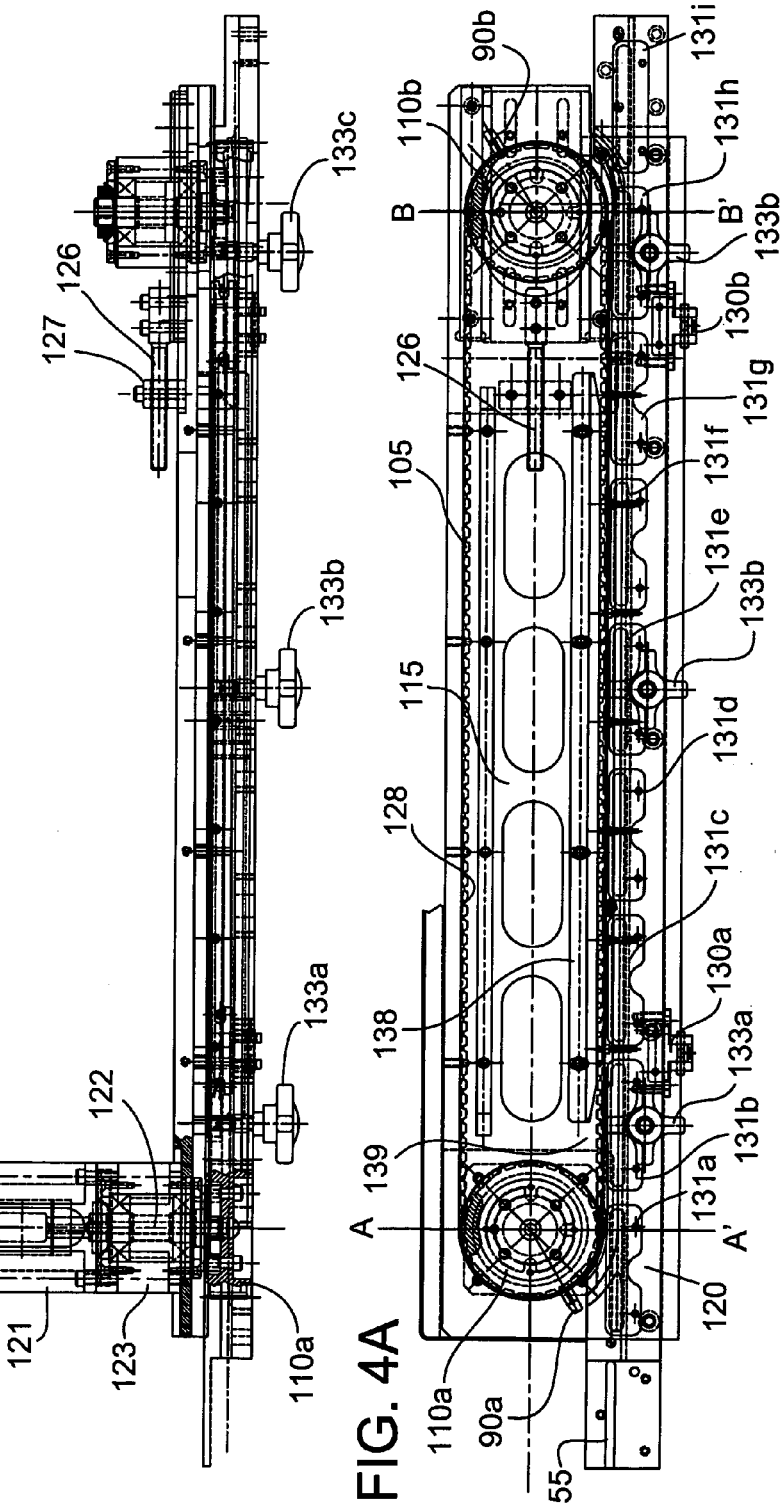

COMPONENT CONTROL DEVICE, SYSTEMS, AND METHODS

TECHNICAL FIELD

This invention relates to component transport systems within large machine systems, and more particularly to component deceleration systems.

BACKGROUND

Component transport systems are used to transport components from one location to another within large machine systems. Such systems can include pneumatic and gravity fed systems.

Pneumatic transport systems are used to transport components, such as razor cartridges, from one location to another typically remote location within large machine systems, e.g., from a magazine to a rotary table along a feed conduit. These systems typically can include a device to impart an air pressure differential along the system, e.g., a blower or vacuum pump, an injection nozzle, a narrow diameter tube that leads from a first point to a second point, and a mechanical control system that properly aligns the tubing over the appropriate first point, e.g., a specific position in a magazine. These transport systems often include no braking mechanism or can include a counter-flowing air stream to slow the components, e.g., once they reach the end of the tube at a delivery location.

In these systems, either the injection nozzle or the magazine moves to sequentially center the tubing over a specific point to receive a component or a stack of components. Once centered, the nozzle fires a blast of air that lifts and moves a stack of components out of the magazine and through a tube to a feed conduit. The components can move at very high velocities, and absent a braking system, impact a stop device once they reach the delivery location. Such impact can damage or misalign the components in the feed conduit.

Some pneumatic transport systems include a braking mechanism that includes one or more nozzles or openings upstream of the feed conduit. These nozzles or openings are supplied with high pressure air to produce one or more streams that flow in a direction opposite to the direction of the components. The high pressure air streams are set to slow the components approaching the delivery location. Although useful to slow the velocity of the approaching components, this braking mechanism requires careful calibration of the volume and speed of the counter-flowing air streams. Such systems are generally not configured to compensate for variations in approaching component velocities, conditions which are typical in pneumatic transfer operations. Nor can these systems compensate for variations in air pressure or flow rate through needle valves which are typical in production environments.

SUMMARY

In general, the invention features apparatus for receiving and decelerating components. Such apparatus include a component track extending between input and output ends and sized for receiving the components, a conveyor mounted adjacent the component track and comprising a projection configured to move within the component track, a sensor positioned upstream of the input end of the component track to detect speed of the components approaching the component track, and a controller in communication with the sensor and configured to adjust the speed of the projection within the component track based on the speed of the components approaching the component track, to decelerate the components within the component track.

The invention also features methods of receiving and decelerating moving components, by positioning a control surface within a component track ahead of the moving component, slowing the control surface to engage the moving component, further slowing the control surface and the moving component to a predetermined velocity, and releasing the moving component after achieving the predetermined velocity.

The new apparatus and related methods can be embodied in systems to provide predictable transport and control of components through transport systems within large machine systems. In various implementations, the new systems catch components at pneumatic transport speeds, decelerate these components through a predetermined deceleration profile, and release the components at a predetermined safe speed to the delivery location. The systems provide a controlled flow of components from one location to another within a production environment, for example, while minimizing or preventing altogether damaged or misaligned components, which can plague other deceleration systems. Once installed, the new systems need only minimal calibration and setup, as compared with e.g., counter-flow air stream systems.

In one aspect, an apparatus for receiving and decelerating components includes a component track extending between input and output ends and sized for receiving the components, a speed control device mounted adjacent the component track and comprising a projection configured to move within the component track, a sensor positioned upstream of the input end of the component track to detect the speed of the components approaching the component track, and a controller in communication with the sensor and configured to adjust the speed of the projection within the component track based on the speed of the components approaching the component track, to decelerate the components within the component track.

In some implementations, the apparatus include an actuator configured to extend and retract the projection within the track. The actuator can be servo-controlled and/or include a pneumatic or solenoid actuator, for example.

In various implementations, the controller is configured to adjust the speed of the projection based on the speed of the components conveyed along the component track. The controller can be configured to decelerate the components according to a predetermined motion profile.

The speed control device can include a chassis having first and second wheels mounted for rotation at opposite ends thereof and further comprising a timing belt trained about the first and second wheels. The speed control device can also include two projections equally spaced along the length of the timing belt. In some embodiments, the timing belt include grooves and the wheels can include teeth configured to engage the grooves of the conveyor belt. The component track can include a tube, track, rail or wire.

In another aspect, a system for conveying a component from a first location to a second location includes a component track extending between input and output ends and sized for receiving the components, a speed control device mounted adjacent the component track and comprising a projection configured to move into, out of, and along the component track, a first sensor positioned upstream of the input end to detect the proximity of the components approaching the component track, a controller in communication with the first sensor and configured to adjust the speed of the projection within the component track based on the proximity of the components approaching the component track, to decelerate the components within the component track, a feed conduit extending from the first location to the component track, and a power source to propel the components from the first location to at least the input end of the component track.

In various implementations, the system includes a delivery conduit extending from the component track to the second location. At least one of the feed conduit, component track, and delivery conduit can include a tube, track, rail or wire. The components can be conveyed with a pressure differential, introduced along at least one of the feed conduit, component track, and delivery conduit. The component track can also include a slotted passage substantially extending along the length of the speed control device, where the slotted passage is sized to receive the projection.

In various implementations, the system also includes a track cover attached to the slotted passage to define a substantially closed passage dimensioned and configured to receive the components and the projection. The projections can be configured to pass between the slotted passage and the track cover and/or extend sufficiently into the component track to block passage of the components traveling therein. The system can also include a second velocity sensor positioned proximate the output end of the component track to detect the speed of the components departing the component track. In some embodiments, the first and second sensors include at least one magnetic induction sensor, a microwave sensor, an optical sensor, or a laser sensor.

In another aspect, an apparatus to control delivery of components in a component conduit includes first and second wheels, a continuous conveyor belt trained about the first and second wheels, wherein at least one of the wheels is operably connected to a motor, a component track mounted adjacent to the conveyor belt, a projection extending from the belt and protruding into a slot extending along a wall of the component track, a sensor located along the component track to detect the proximity of components passing through the component track, and a belt controller in communication with the sensor to control the speed of the motor according to a predetermined acceleration profile.

In another aspect, a method of decelerating a moving component includes positioning a control surface within a component track ahead of the moving component, setting the control surface speed to engage the moving component, further slowing the control surface and the moving component to a predetermined speed, and releasing the moving components from the component track.

In various implementations, this method includes measuring the proximity and/or the velocity of the component approaching the control surface and controlling the control surface as a function of the component velocity. In some instances, two control surfaces equally spaced along the length of the belt are positioned with this method.

In some embodiments, the control surface extends from a continuous belt trained between two rotating wheels and the method includes controlling the rotation of at least one of the wheels according to the predetermined motion profile.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control.

In addition, the materials, methods, and examples are illustrative only and not intended to be limiting.

Other features and advantages of the invention will be apparent from the description, and from the claims.

BRIEF DESCRIPTION OF DRAWINGS

FIGS. 4A, 4B, and 4C are front, plan, and side views of a conveyor of the component transport system of FIG. 1.

Like reference symbols in the various drawings indicate like elements.

DETAILED DESCRIPTION

This description relates to apparatus, systems, and related methods for capturing, controlling, and releasing components for safe and efficient delivery from a first station of a component transport system to a second station in the transport system.

Figure 1:
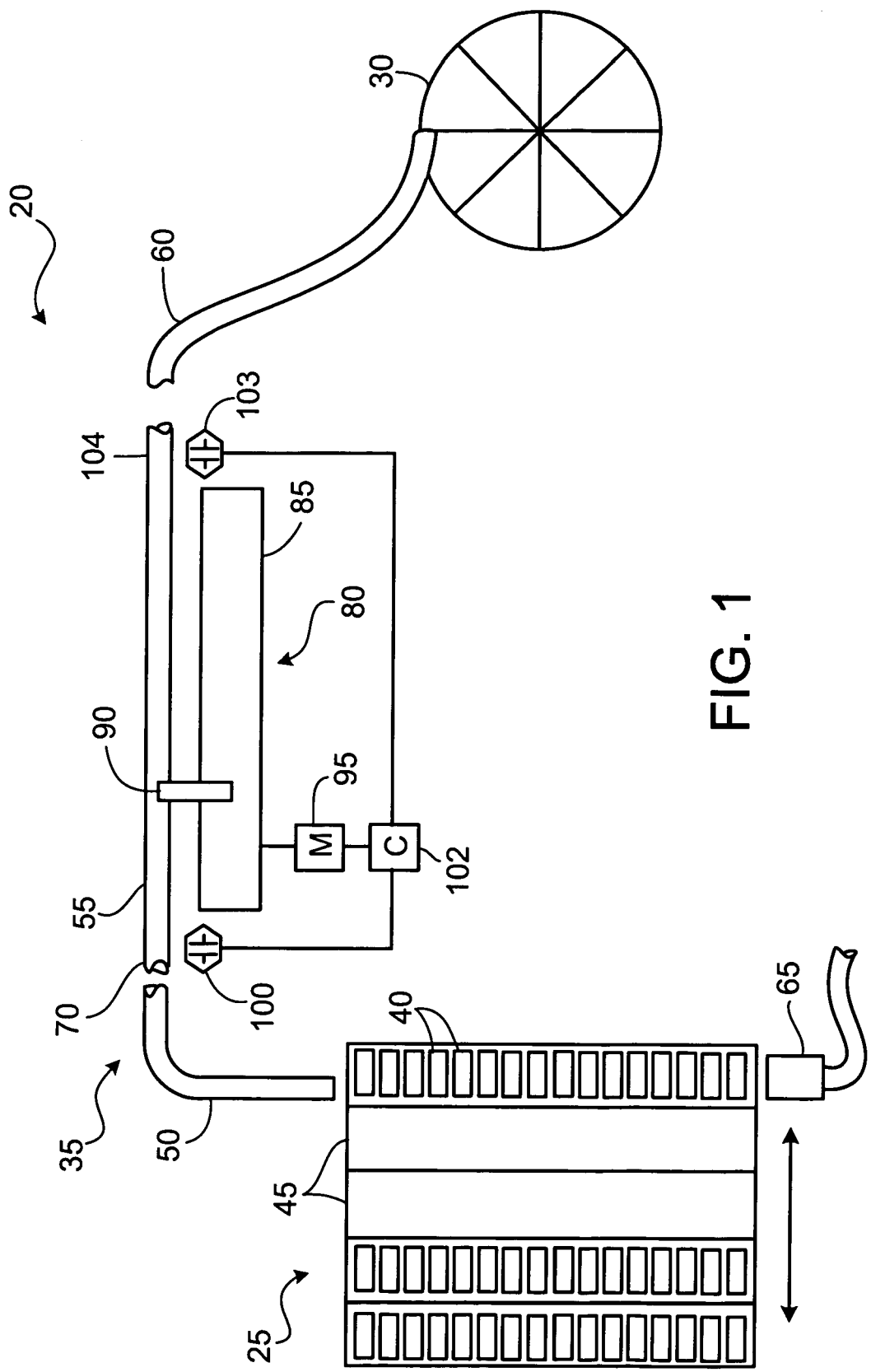
FIG. 1 is a schematic diagram of a component transport system including a conveyor that controls the speed of the components as they travel through the system.
Figure 2:
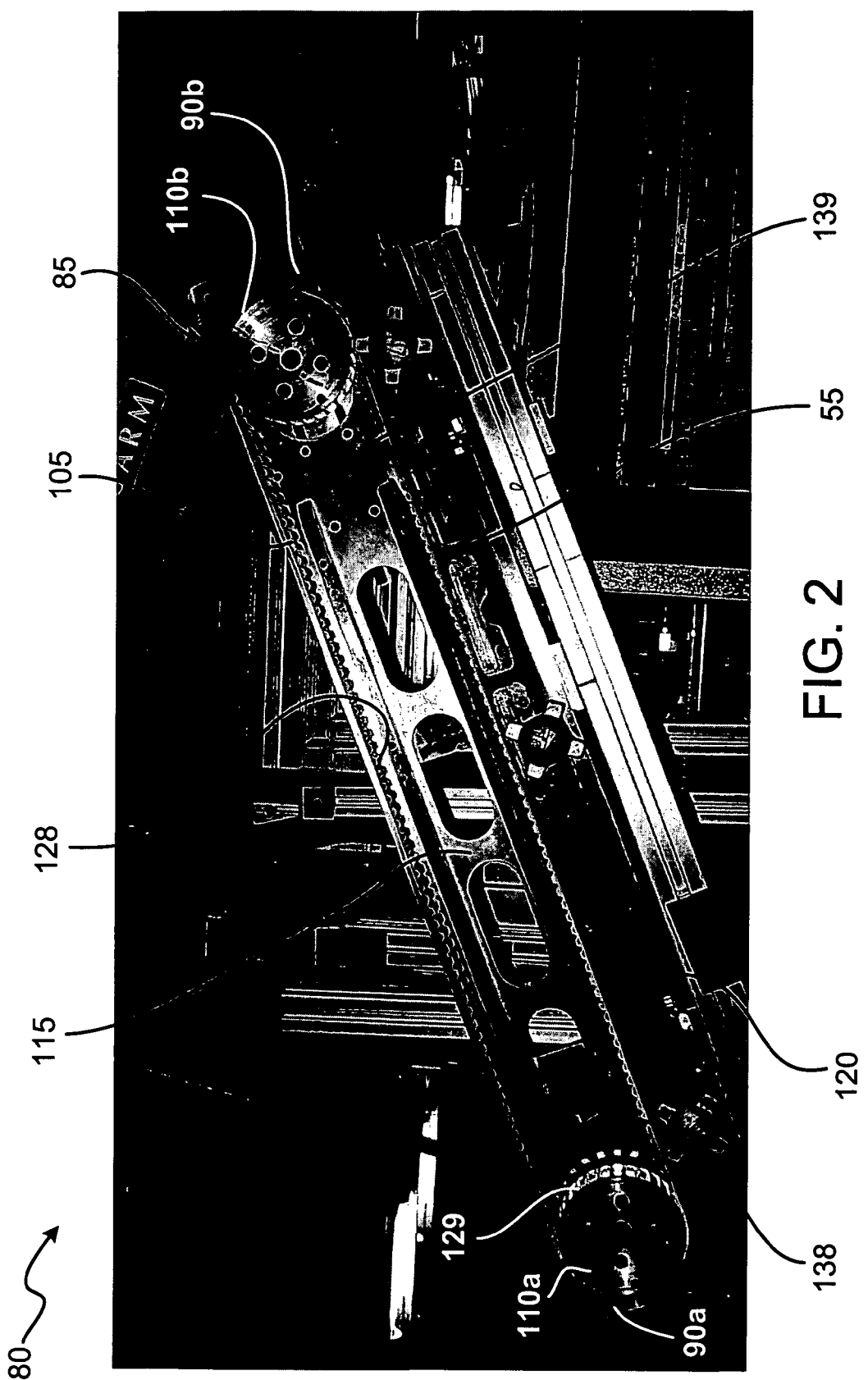
FIG. 2 is a side view of a conveyor of the component transport system of FIG. 1.
Figure 3:
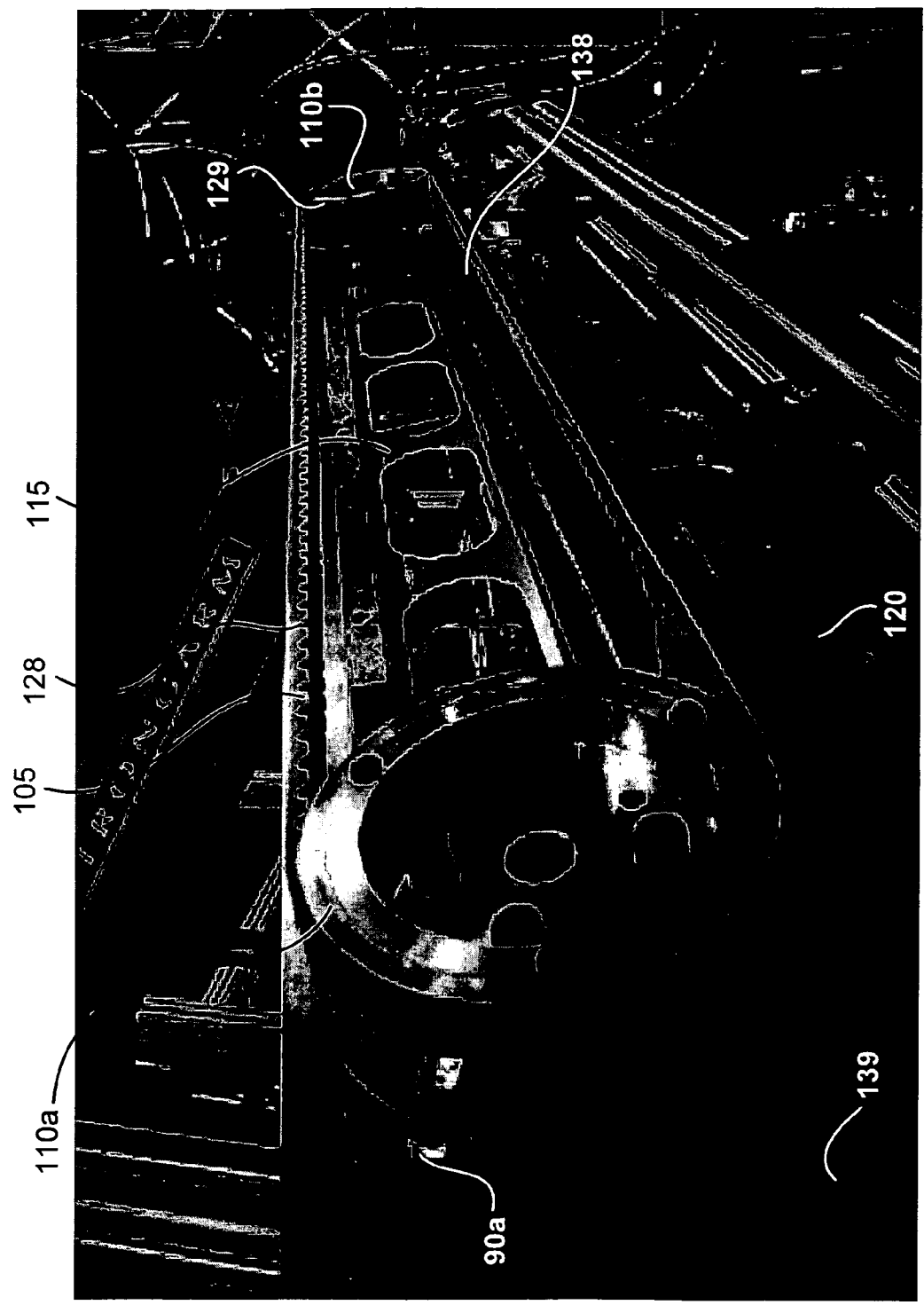
FIG. 3 is a perspective view of the conveyor of FIG. 2.

In general, as shown in FIGS. 1-3, the system 20 includes a magazine 25, a rotary table 30, and a feed conduit 35 extending therebetween, to transport a number of components 40, e.g., fourteen razor cartridges, stacked in a chamber 45 of the magazine 25 to the rotary table 30. In some embodiments, the system 20 includes multiple magazines 25 and multiple rotary tables 30, with suitable gates (not shown) to control the transport of components 40 from each magazine to each table. In some embodiments, the system 20 is configured to transport multiple component types each having a substantially similar cross-sectional profile, but different colors or features.

The feed conduit 35 can be formed from flexible tubing with an inside shape sized to convey and maintain alignment of the components 40 traveling through the conduit. In some embodiments, the feed conduit 35 is formed into a compound shape, by extrusion for example, which generally corresponds to the profile of the components. The system 20 can be used for the controlled delivering of a varying number of components (i.e., component batches) or a single component. In some embodiments, the system 20 can be used to control the delivery of components which are susceptible to damage from rapid deceleration or impact with either the adjacent components or the rotary table 30.

With specific reference to FIG. 1, an entry portion 50 of the feed conduit 35 extends from the magazine 25 to a component track 55 and an exit portion 60 of the feed conduit 35 extends from the component track 55 to the rotary table 30. In some embodiments, the component track 55 is substantially horizontal. In other embodiments, the component track 55 is angled from the horizontal. In some embodiments, the component track 55 feeds directly to a delivery location without an exit portion 60.

The system 20 can implement any delivery system to propel components 40, e.g., a pneumatic delivery system or a gravity fed system.

In certain embodiments, a source of high pressure air 65, e.g., an injection nozzle, is positioned under an individual chamber 45 of the magazine 25, and once centered, fires a blast of air to move the components 40 at a very high velocity out of the magazine 25 along the entry portion 50 of the feed conduit 35 and toward an input end 70 of the component track 55. In some embodiments, the source of high pressure air 65 is configured to move under the different chambers 45 of the magazine 25. In other embodiments, the source of high pressure air 65 is stationary and the magazine 25 moves such that the high pressure air can be introduced to each of the chambers 45 and thereby propel the components 40 along the entry portion 50 of the feed conduit 35.

A speed control device 80 is positioned proximate the component track 55 and includes a conveyor 85 and one or more, e.g., two or more projections 90 or "dogs" connected to the conveyor 85 and sized to move within the component track 55 to block and control the passage of components 40 traveling along the component track 55. The conveyor 85 and hence the protrusions 90 are operably linked to a motor 95. In some embodiments, the motor 95 is a precisely controlled servomotor with a brake, such as Allen Bradley model number 1326AS-B310H-21-K3, for example.

The protrusions 90 are configured to extend into the component track 55 and engage each component 40 that enters the component track 55 or the first of a stack or batch of components 40 that enters the component track 55 and were delivered from the magazine 25. The speed of the motor 95 is controlled to allow the components 40 to contact the projection 90 at a speed slightly slower than that of the components 40 as they first arrive in the component track 55. With all of the components 40 bearing on the projection 90, the speed of the motor 95, the projections 90, and the batch of components 40, is precisely controlled along the component track 55 to the desired entry speed for the components 40 traveling into the exit portion 60 of the feed conduit 35. The components 40 then proceed to the exit portion 60 of the feed conduit 35 to a delivery location, e.g., the rotary table 30. For example, the components 40 can be brought to a standstill in the exit portion 60 of the feed conduit 35.

With renewed referenced to FIG. 1, and in various embodiments, an upstream sensor 100 is located proximate the input end 70 of the component track 55 to measure the proximity and/or speed of the components 40 approaching the component track 55 in the feed conduit 35. The sensor 100 can be, e.g., a magnetic induction sensor, a microwave sensor, an optical sensor or a laser sensor. A controller 102 in communication with the sensor 100 adjusts the speed of the motor 95 and hence the speed of the projections 90 based on the signal from the velocity sensor 100. In some embodiments, a downstream velocity sensor 103 is located proximate an exit end 104 of the component track 55 to measure the speed of the components 40 after deceleration along the component track 55. The downstream sensor 103 can provide a feedback signal to the controller 102 for control of the motor 95 to verify that the system is functioning within design limits, and/or to provide indication that a given cycle is complete.

In certain embodiments, as shown in FIGS. 2 and 3, the conveyor 85 includes a continuous belt 105 trained about two wheels 110a, 110b mounted for rotation at opposite ends of a conveyor chassis 115. The component track 55 extends along the chassis 115 between the two wheels 110 and is enclosed along one side by a track cover 120. The component track 55 and track cover 120 are configured to permit entry, passage, and withdrawal of the projections 90. The two projections 90a, 90b extend from different locations on the belt 105 and are sized to move within the component track 55 into which the components 40 are directed.

In some embodiments, two projections 90 are spaced equally along the belt 105 and are conveyed half way around the belt 105 each cycle, thereby alternating projection 90a and projection 90b to catch the components on alternate cycles to permit the highest frequency of batch deliveries with this configuration. The controller 102 controls the speed of the motor 95, the two wheels 110a, 110b, and thus the belt 105 and the projections 90, based on an input signal from one or more of the sensors 100a, 100b, 103.

Figure 5A:
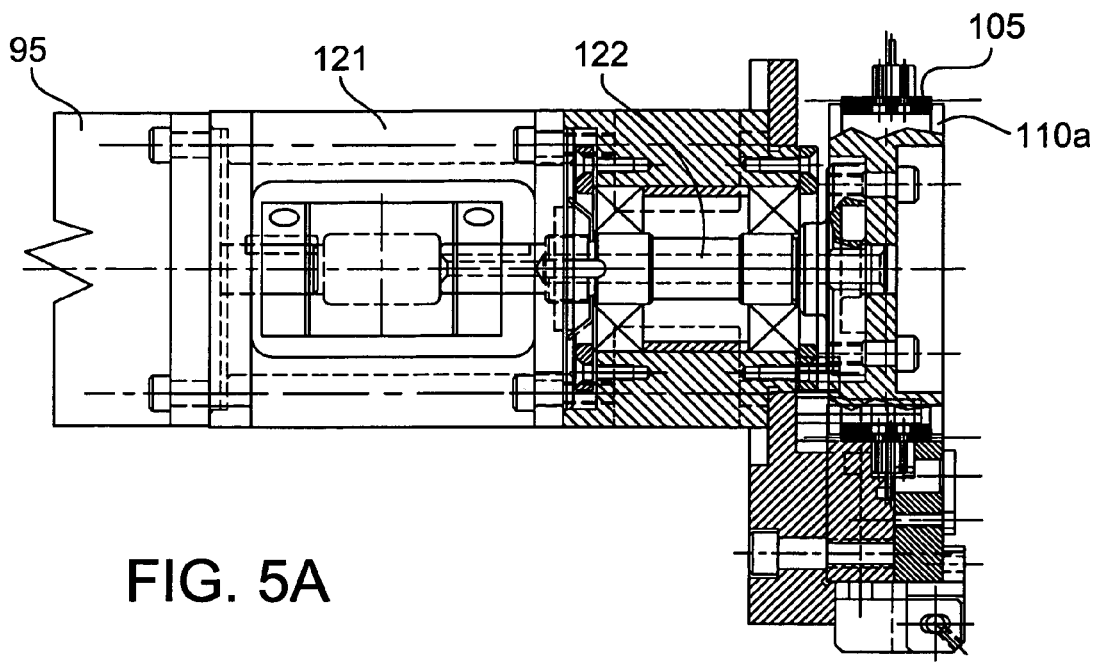
FIG. 5A is a sectional view along line A-A' of FIG. 4A.
Figure 5B:
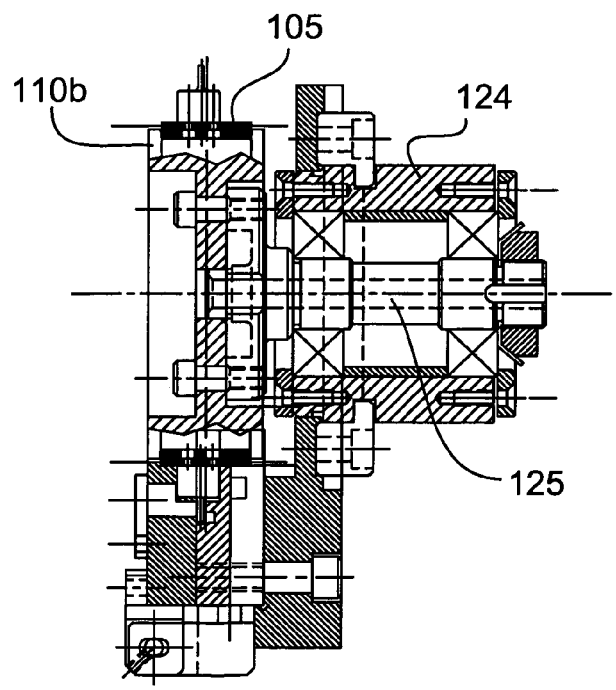
FIG. 5B is a sectional view along line B-B' of FIG. 4A.

Referring to FIGS. 4A to 5B and in one embodiment, the motor 95 is operably linked to the wheel 110a via a coupling 121, which in turn is connected to the wheel 110a by a shaft 122 extending through a shaft housing bearing 123 disposed between the coupling 121 and the wheel 110a. The motor 95 drives the wheel 110a, which in turn, drives the belt 105 and the projections 90 attached thereto. Referring to FIG. 5B, the movement of the belt 105 rotates the wheel 110b about a shaft idler 124 extending through a idler housing bearing 125 positioned at one end of the chassis 115.

With continued reference to FIGS. 4A and 4B, and in some embodiments, the position of the wheel 110b can be slideably adjusted along a longitudinal direction of the component track 55 to achieve the desired tension in the belt 105 extending between the fixed wheel 110a and the moveable wheel 110b. An elongate tension rod 126 is affixed to a base portion of the wheel 126 and slideably received by a tension block 127 attached to the chassis 115. When the desired longitudinal position of the wheel 110b is reached, the wheel 110b is locked in place on the chassis 115 by securing the tension rod 126 within the tension block 127, e.g., by turning a fastener, such as a screw, located and threadably disposed in the tension block 127, to engage and secure the tension rod 126.

The motor 95 and controller 102 are configured to rapidly and continuously change the velocity of the projections 90 from a rapid ramp-up, to substantially the same velocity of the components 40 as they enter the component track 55, to a rapid ramp-down to the desired speed of the components 40 exiting the component track 55. The configuration of the conveyor 85 permits rapid transport of the components 40 from the magazine 25 to the conveyor 85 while reducing or preventing impact damage to the components 40 arriving at the delivery location, e.g., the rotary table 30.

Referring to FIGS. 2 to 4A, and 6, the belt 105 can include grooves 128 sized to engage teeth 129 arranged about the circumference of the wheels 110a and 110b to maintain the position of the belt 105 with respect to the wheels 110. This configuration, together with the precisely controlled motor 95 that is operably linked to the wheel 110a, maintains register of the position of the projections 90.

Figure 6:
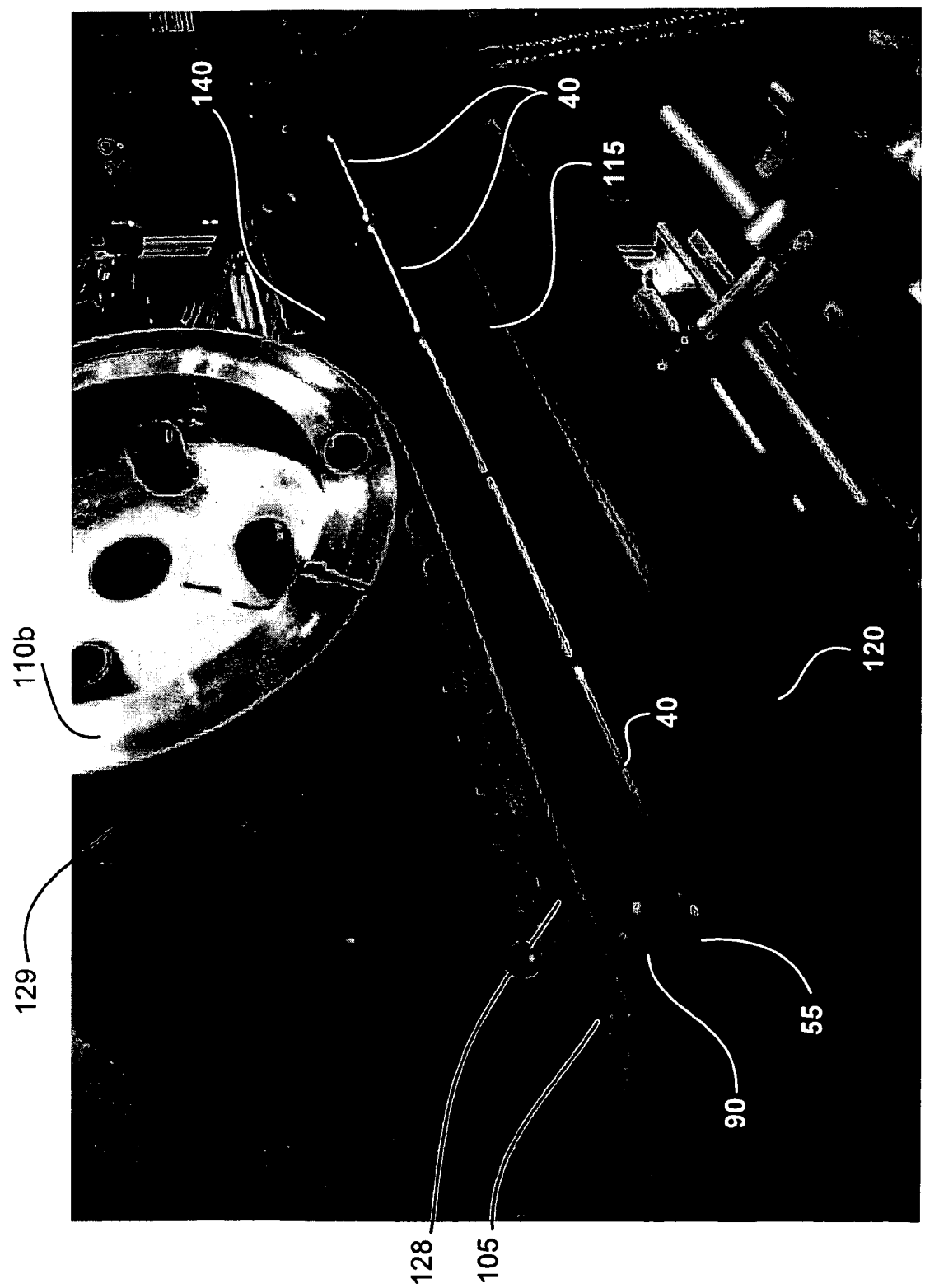
FIG. 6 is a detail view of a portion of the conveyor of FIG. 2.

With continued reference to FIGS. 2 to 4A, and 6, the track cover 120 is attached to the chassis 115 with one or more hinges 130a, 130b which permit the track cover 120 to be rotated away from the chassis 115 about the hinges to permit inspection of the component track 55 (FIG. 6). One or more substantially transparent lens covers 131a-131i are attached to openings positioned along the track cover 120 to permit visual inspection of the passage of component 40 through the component track 55 while the system 20 is in operation. One or more knobs 133a-133c are positioned along the track cover 120 and include threaded posts which, when rotated, engage threaded holes within the chassis 115 to secure the track cover 120 to the chassis 115.

In some embodiments, a belt guide 138 extends along a lower portion 139 of the chassis 115 between the wheels 110a and 110b to bias the belt 105 and the projections 90 attached thereto toward the component track 55 as the projections travel along the lower portion of the chassis 115.

Referring to FIG. 6, components 40 are arranged end-to-end along the component track 55 (shown with the track cover 120 rotated away from the chassis 115 about the hinges 131) bearing on projection 40. The number of projections 90, the distance between projections 90, as well as the length of the component track 55, can vary according to the number and dimensions of the components 40, and the magnitude of the desired deceleration of the components 40. The dimensions of the component track 55 along the conveyor 85 are configured to maintain the alignment and orientation of the components 40 passing along the component track 55. An arcuate conduit 140 is positioned proximate the wheel 110b and generally follows the circumference of the wheel 110b and merges with the component track 55. This arcuate conduit 140 permits passage of the projections 90 into the component track 55 as the projections 90 are carried about the belt 105 trained about the wheel 110b. A similar arcuate conduit (not shown) is positioned proximate the wheel 110a to permit passage of the projections 90 out of the component track 55. In some embodiments, the system 20 can be configured to allow pressure introduced by the high pressure source 65 to escape to ambient at the locations where the projections 90 enter and exit the component track 55, while maintaining the desired transport speed of the components 40.

In some embodiments, the batch of components 40 is typically "shot" from the a first station to a second station via a very short impulse of high pressure air sufficient to accelerate the batch to a high enough initial velocity to achieve transport along the feed conduit 35. Additional air jets can be incorporated to keep them moving if very long distances are required. Pressurization is generally not required in these systems and typically will not assist transport because the components are usually loosely fitted in the conduit and cannot sustain much pressure.

In operation, as shown in FIGS. 7A to 7E, the components 40 approach the component track 55 extending along the conveyor 85 from the entry portion 50 in the direction of arrow 150 after launch from the chamber 45 of the magazine 25 (FIG. 1). In some embodiments, the speed control device 80 includes two upstream sensors 100, a first upstream sensor 100a configured to signal the controller that components are in route at a preset distance upstream, while a second upstream second 100b located a predetermined distance S away from the first upstream sensor 100a, provides the necessary second signal for the controller 102 (FIG. 1) to compute the speed of oncoming components. When the sensors 100 detects the proximity and/or speed of an approaching component 40, or a batch of components 40, the wheels 110a and 110b rotate in the direction of arrow 155 and the conveyor 85 begins a motion profile to accelerate the belt 105 and hence the projection 90b along the lower portion 139 of the conveyor 85 to a velocity slightly lower than that of the oncoming components 40.

Figure 7A:
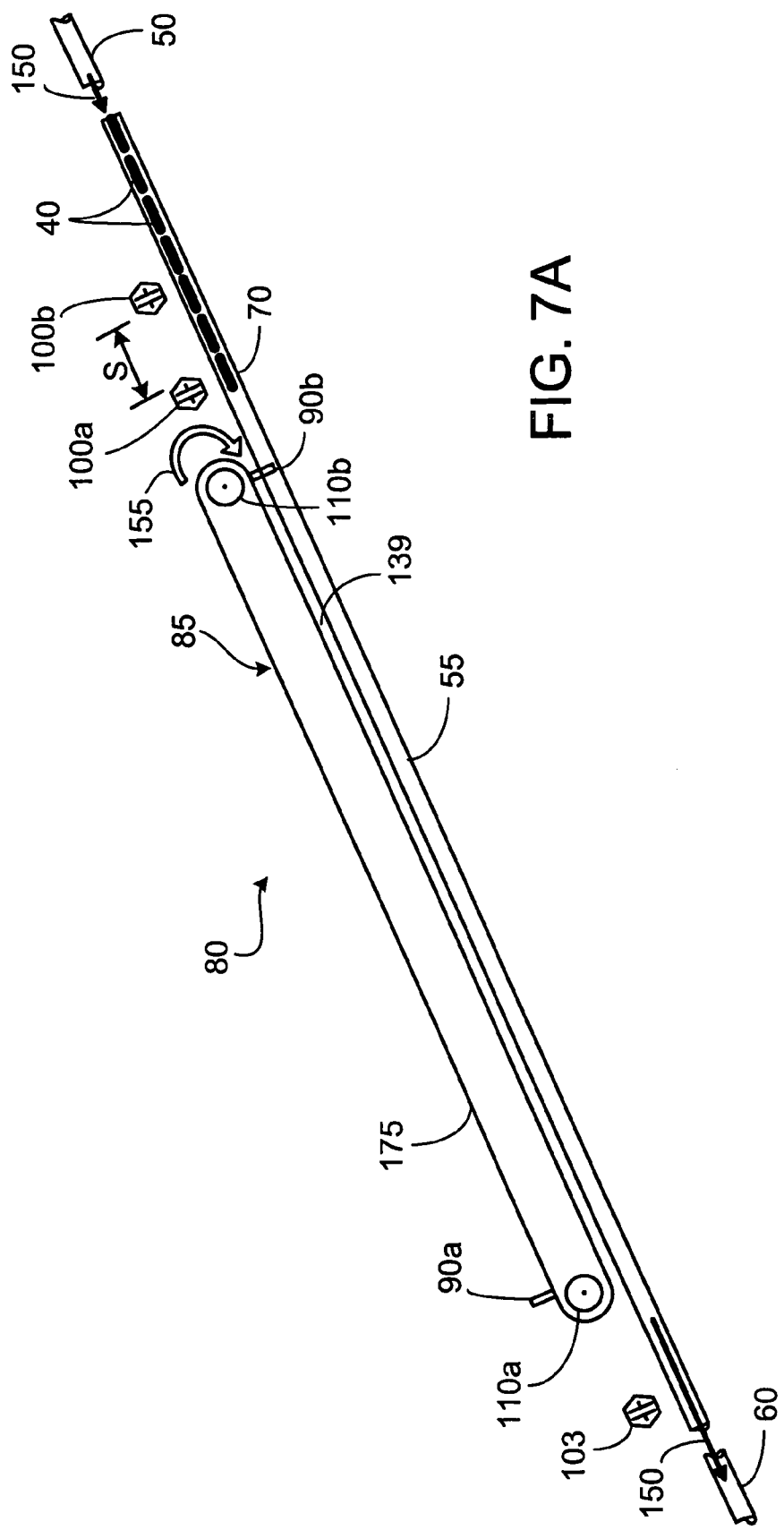
FIGS. 7A-7E are schematic diagrams of the conveyor of the component transport system of FIG. 1 at progressive stages of operation.
Figure 7B:
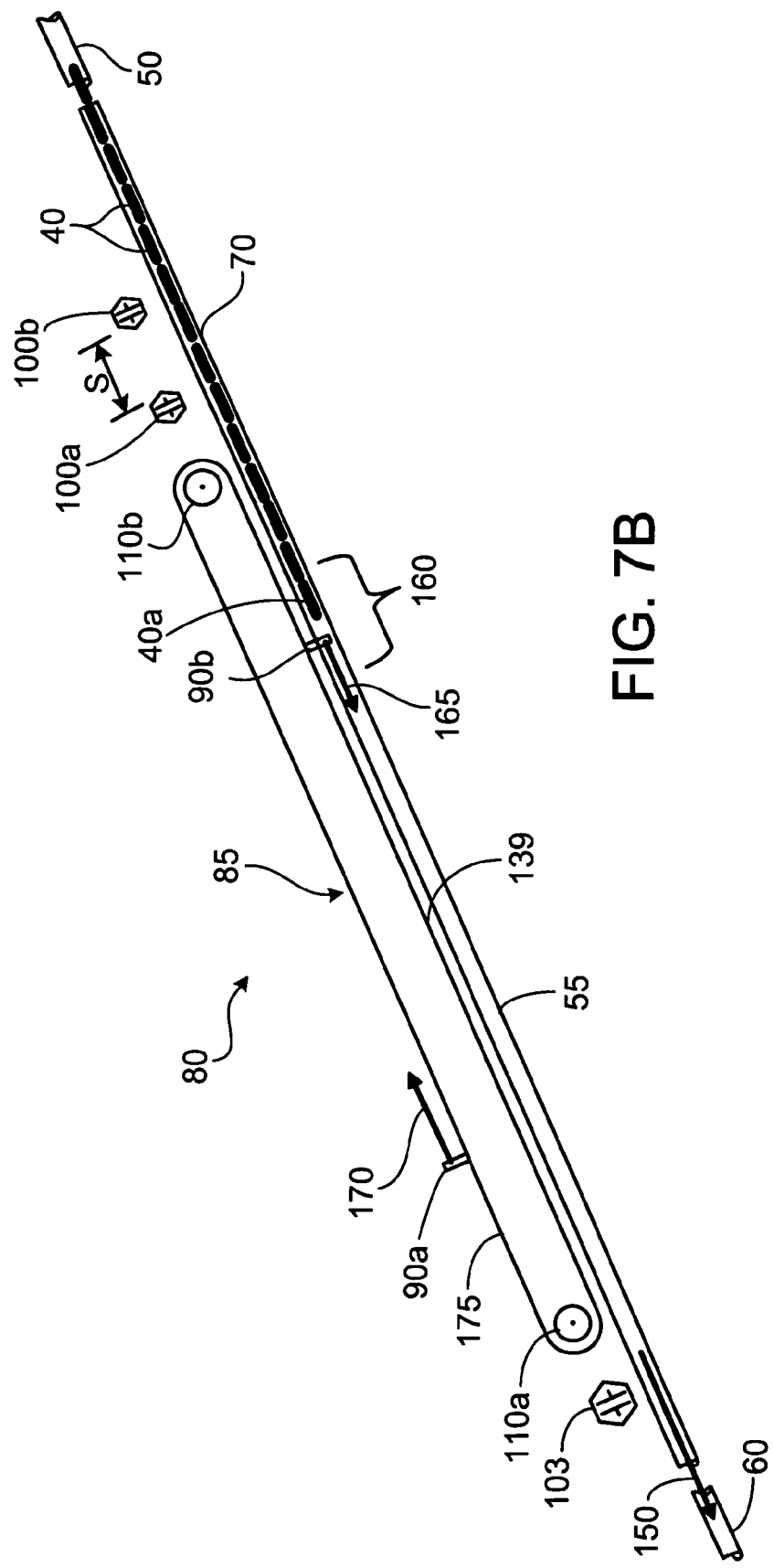
Figure 7C:
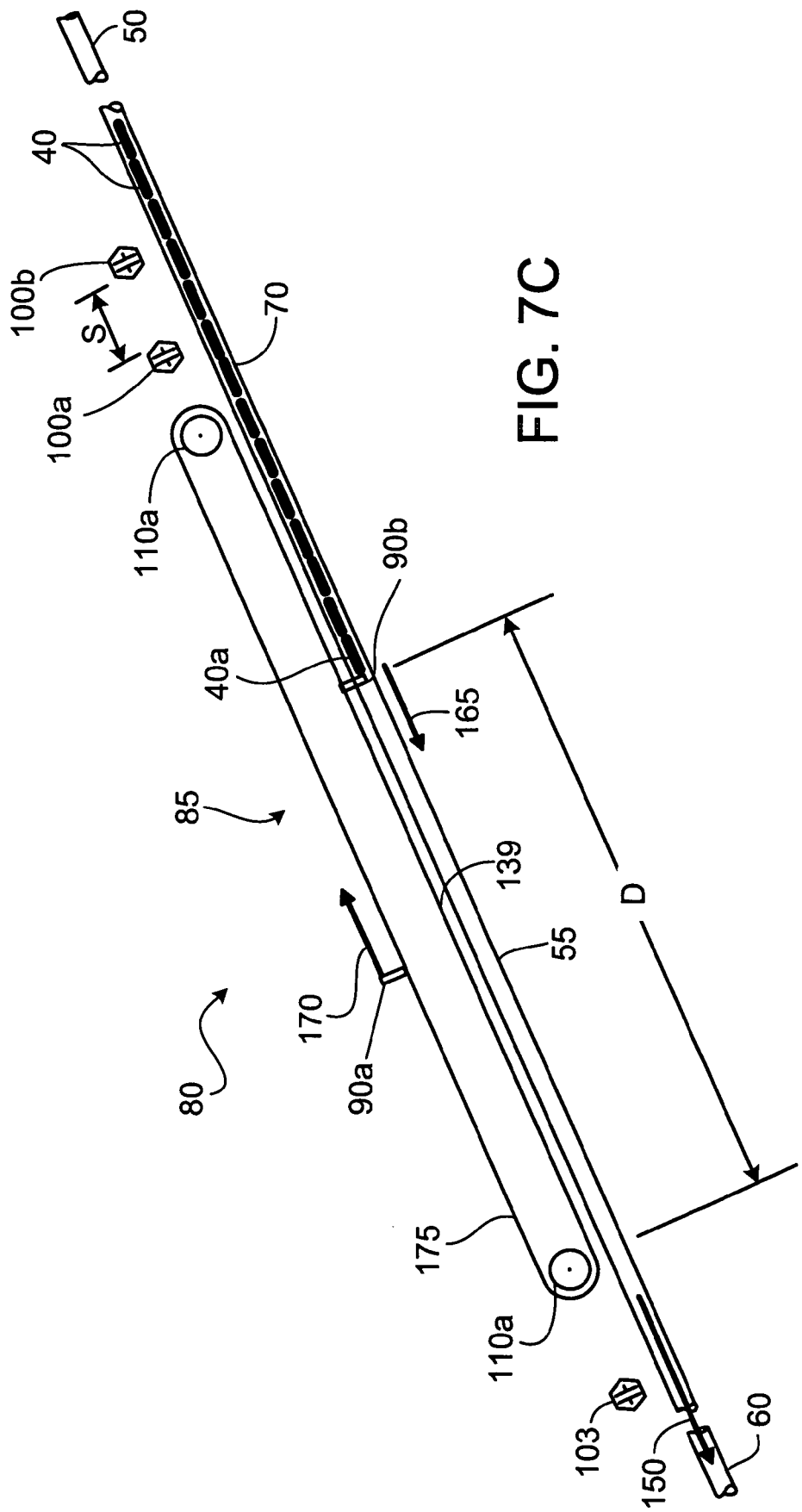

As shown in FIG. 7B, the projection 90b and the leading component 40a proceed within a catch zone 160 until the component 40a contacts the projection 90b as shown in FIG. 7C. As the projection 90b continues to move in the direction of arrow 165 along the lower portion 139 of the conveyor 85, the projection 90a moves in the direction of arrow 170 along an upper portion 175 of the conveyor 85 opposite the direction of arrow 165.

In certain embodiments, each of the components 40 are in direct or close contact with adjacent components moving along the feed conduit 55, and all move with substantially the same velocity as the projection 90b in the direction of arrow 165.

Figure 7D:
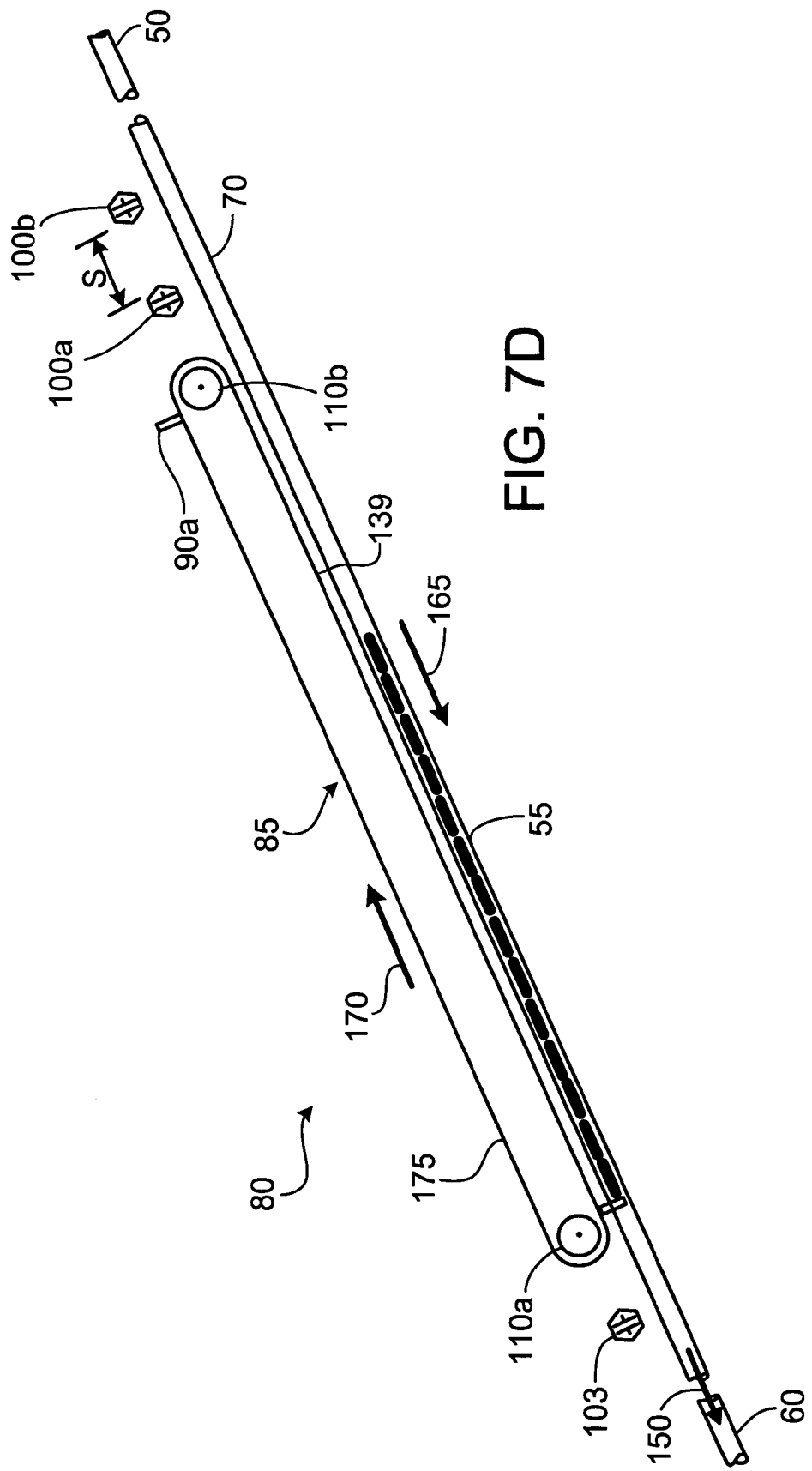
Figure 7E:
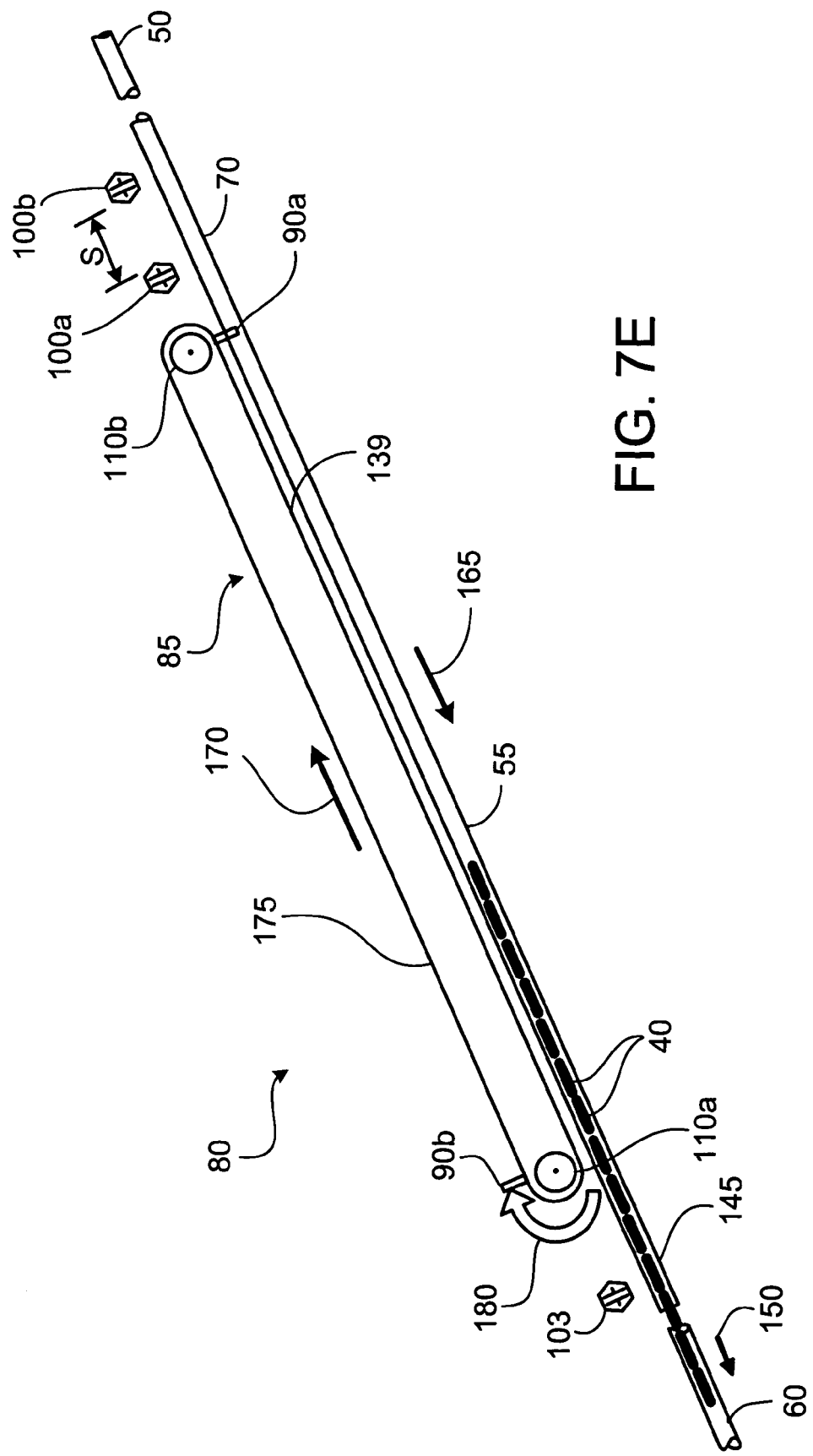

Referring again to FIG. 7C, after the leading component 40a contacts the projection 90b, the wheels 110a, 110b, and hence the belt 105, begin a deceleration profile as the projection 90b moves along a distance D until the projection 90b is proximate the wheel 110a on the lower portion 139 of the conveyor as shown in FIG. 7D. As shown in FIG. 7E, after the projection 90b reaches the end of distance D and the velocity of the components 40 is reduced to a predetermined speed, the projection 90b rotates around the wheel 110a in the direction of arrow 180 and withdraws from the component track 55, thereby releasing the components 40 from the component track 55 and into the exit portion 60 to another location within the system 20, e.g., the rotary table 30 (FIG. 1). With continued reference to FIG. 7E, the projection 90b now moves to the upper portion 175 of the conveyor 85 and the projection 90a now moves into the component track 55 into the position shown. The conveyor 85 is now ready to receive and decelerate another batch of components 40.

Figure 8:
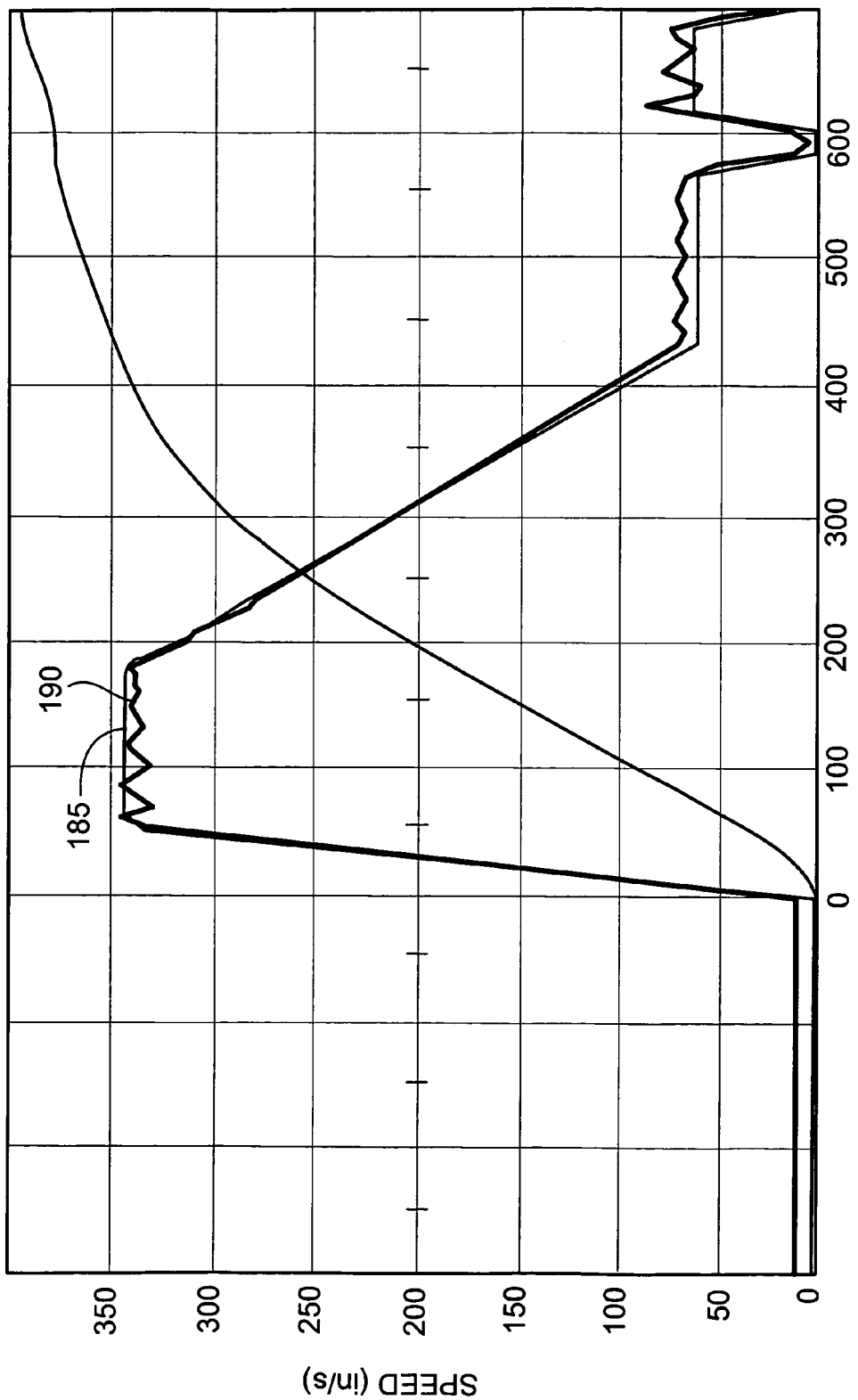
FIG. 8 is a graph of a motion profile of a component engaging the conveyor of FIG. 1.

FIG. 8 shows an example motion profile for operation of the motor 95, the wheels 110a, 110b, and hence the projections 90a, 90b extending from the belt 105 (FIG. 2) for one cycle of operation. A programmed motion profile is represented by a curve 185 and an actual motion profile followed by the conveyor 85 is represented by a curve 190. At 0 ms, the projection 90b is positioned as in FIG. 7A. From 0 ms to about 50 ms, the projection 90b rapidly accelerates up to a speed of about 340 inches per second to the position shown in FIG. 7B, in advance of the approaching components 40, traveling at approximately 360 inches per second.

In one embodiment, the projection 90b maintains a substantially constant speed of about 340 inches per second from about 50 ms to about 180 ms during passage through the catch zone 160 as shown in FIG. 7B. The projection 90b progresses along the catch zone 160 at a speed slightly slower than that of the leading component 40a and engages the component 40a within the catch zone 160. At the end of the catch zone 160, the speed of the projection is rapidly slowed along the distance D shown in FIG. 7C according to the motion profile 190 until about a time of 420 ms when the projection travels at a speed of 60 inches per second.

Although the programmed and actual motion profiles 185, 190, shown in FIG. 8 from about 180 ms to about 430 ms are substantially linear, other nonlinear, e.g., parabolic or quadratic profiles, are possible. At about 500 ms, the projection 90b reaches the end of the component track 55, as shown in FIG. 7D and rotates around the wheel 110a in the direction of arrow 180 as shown in FIG. 7E at a substantially constant velocity of about 65 inches per second until the end of the cycle is reached. The projection 90b then withdraws from the component track 55 and releases the components 40 to the exit portion 60 of the feed conduit 35 and into another location within the system 20, e.g., the rotary table 30 (FIG. 1) as shown in FIG. 7E.

In certain embodiments, e.g., as shown in FIG. 7E, the projection 90a is now positioned along the lower portion 139 of the conveyor 85 as shown in FIG. 7E and will follow substantially the same deceleration profile represented by the curve 190 in FIG. 8 for the next batch of components 40 (not shown) approaching from the magazine 25 along the entry portion 50 of the feed conduit.

Figure 9:
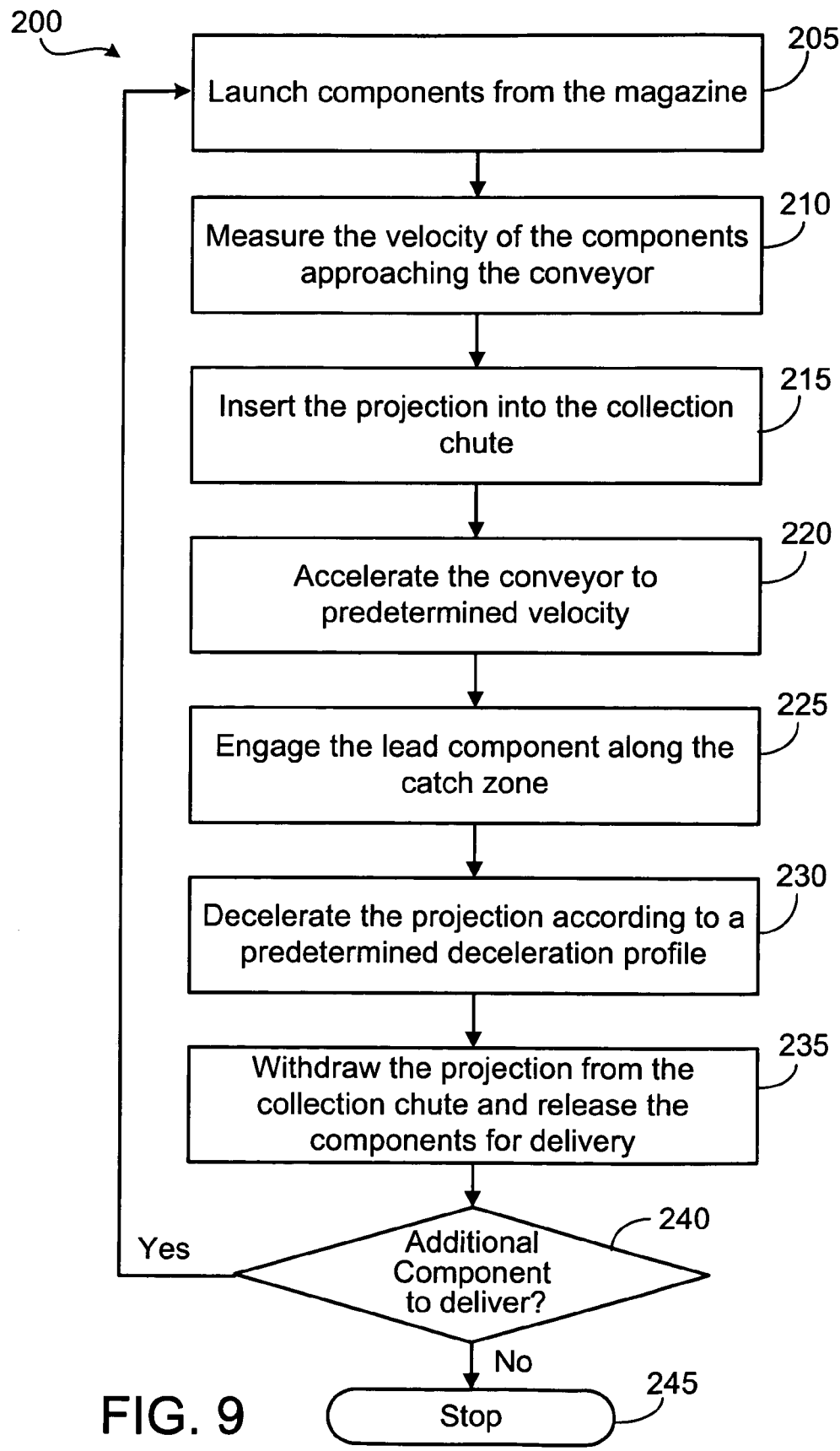
FIG. 9 is flowchart depicting a control sequence for the component transport system of FIG. 1.

Referring to FIG. 9, an operational sequence 200 of the system 20 includes launching 205 the batch of components 40 from the magazine 25, measuring 210 the speed of the components 40 approaching the conveyor 85, inserting 215 the projection 90 into the component track 55, accelerating 220 the projection to a speed substantially the same as that of the oncoming components 40, engaging 225 the lead component 40a, decelerating 230 the projection and the components according to a predetermined deceleration profile, and withdrawing 235 the projection from the component track 55, thereby releasing the components from the component track.

The sequence concludes by determining 240 whether additional components 40 require transport based on operator input provided to the controller 102 and/or the signals the sensors 100a, 100b, 103 provide to the motor controller 102, and restarting the sequence by launching 205 another batch of components, or alternatively, terminating 245 the sequence.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An apparatus for receiving and decelerating components, the apparatus comprising:
    a component track extending between input and output ends and sized for receiving the components;
    a speed control device mounted adjacent the component track and comprising a projection configured to move within the component track;
    a sensor positioned upstream of the input end of the component track to detect the speed of the components approaching the component track; and
    a controller in communication with the sensor and configured to adjust the speed of the projection within the component track based on the speed of the components approaching the component track, to decelerate the components within the component track.

2. The apparatus of claim 1, further comprising an actuator configured to extend and retract the projection within the track.

3. The apparatus of claim 2, wherein the actuator is servo-controlled.

4. The apparatus of claim 2, wherein the actuator comprises a pneumatic actuator.

5. The apparatus of claim 2, wherein the actuator comprises a solenoid actuator.

6. The apparatus of claim 1, wherein the controller is configured to adjust the speed of the projection based on the speed of the components conveyed along the component track.

7. The apparatus of claim 6, wherein the projection is configured to capture the components along a portion of the component track.

8. The apparatus of claim 7, wherein the controller is configured to decelerate the components according to a predetermined motion profile.

9. The apparatus of claim 1, wherein the speed control device comprises a chassis having first and second wheels mounted for rotation at opposite ends thereof and further comprising a timing belt trained about the first and second wheels.

10. The apparatus of claim 9, wherein the speed control device further comprises two projections equally spaced along the length of the timing belt.

11. The apparatus of claim 10, wherein the timing belt comprises grooves and the wheels comprise teeth configured to engage the grooves of the conveyor belt.

12. The apparatus of claim 9, wherein the component track comprises a tube, track, rail or wire.

13. A system for conveying a component from a first location to a second location, the system comprising:
    a component track extending between input and output ends and sized for receiving the components;
    a speed control device mounted adjacent the component track and comprising a projection configured to move into, out of, and along the component track;
    a first sensor positioned upstream of the input end to detect the proximity of the components approaching the component track;
    a controller in communication with the first sensor and configured to adjust the speed of the projection within the component track based on the proximity of the components approaching the component track, to decelerate the components within the component track;
    a feed conduit extending from the first location to the component track; and
    a power source to propel the components from the first location to at least the input end of the component track.

14. The system of claim 13, further comprising a delivery conduit extending from the component track to the second location.

15. The system of claim 14, wherein at least one of the feed conduit, component track, and delivery conduit comprises a tube, track, rail or wire.

16. The system of claim 13, wherein the components are conveyed with a pressure differential, introduced along at least one of the feed conduit, component track, and delivery conduit.

17. The system of claim 13, wherein the component track further comprises a slotted passage substantially extending along the length of the speed control device, the slotted passage being sized to receive the projection.

18. The system of claim 17, further comprising a track cover attached to the slotted passage to define a substantially closed passage dimensioned and configured to receive the components and the projection.

19. The system of claim 18, wherein the projection is configured to pass between the slotted passage and the track cover.

20. The system of claim 13, wherein the projection is configured to extend sufficiently into the component track to block passage of the components traveling therein.

21. The system of claim 13, further comprising a second velocity sensor positioned proximate the output end of the component track to detect the speed of the components departing the component track.

22. The system of claim 21, wherein the first and second sensors comprise at least one magnetic induction sensor, a microwave sensor, an optical sensor, or a laser sensor.

23. An apparatus to control delivery of components in a component conduit, the apparatus comprising:
    first and second wheels;
    a continuous conveyor belt trained about the first and second wheels, wherein at least one of the wheels is operably connected to a motor;

a component track mounted adjacent to the conveyor belt;

a projection extending from the belt and protruding into a slot extending along a wall of the component track;

a sensor located along the component track to detect the proximity of components passing therethrough; and a belt controller in communication with the sensor to control the speed of the motor according to a predetermined acceleration profile.

24. A method of decelerating a moving component, the method comprising:

positioning a control surface within a component track ahead of the moving component;

setting the control surface speed to engage the moving component;

further slowing the control surface and the moving component to a predetermined speed;

measuring the velocity of the component approaching the control surface and controlling the control surface as a function of the component velocity; and releasing the moving components from the component track.

25. The method of claim 24, further comprising positioning and slowing two control surfaces equally spaced along the length of the belt.

26. The method of claim 24, wherein the control surface extends from a continuous belt trained between two rotating wheels, further comprising controlling the rotation of at least one of the wheels according to a predetermined motion profile.

* * * * *

UNITED STATES PATENT AND TRADEMARK OFFICE
CERTIFICATE OF CORRECTION

| | |
|---|---|
| PATENT NO. | : 7,401,695 B2 |
| APPLICATION NO. | : 11/448998 |
| DATED | : July 22, 2008 |
| INVENTOR(S) | : Dikrun DerMarderosian |

Page 1 of 1

It is certified that error appears in the above-identified patent and that said Letters Patent is hereby corrected as shown below:

<u>Column 6</u>

Line 14, delete "10a, 10b," and insert -- 110a, 110b, --.

Signed and Sealed this

Twelfth Day of May, 2009

JOHN DOLL
*Acting Director of the United States Patent and Trademark Office*